United States Patent [19]

Linam

[11] 4,050,647
[45] Sept. 27, 1977

[54] SUPPORT WITH DRAG ARRANGEMENT
[75] Inventor: Richard L. Linam, League City, Tex.
[73] Assignee: Kelso Marine, Inc., Galveston, Tex.
[21] Appl. No.: 673,587
[22] Filed: Apr. 5, 1976
[51] Int. Cl.² .......................................... B65H 49/00
[52] U.S. Cl. ................................. 242/129.8; 242/156
[58] Field of Search ................... 242/54 R, 68.1, 75.4, 242/156, 156.2, 129.4, 129.8

[56] References Cited
U.S. PATENT DOCUMENTS

| | | | |
|---|---|---|---|
| 2,385,479 | 9/1945 | Underhill | 242/68.3 |
| 2,681,401 | 6/1954 | Anderson | 242/156 |
| 3,168,995 | 2/1965 | Ostermann | 242/129.8 |
| 3,323,752 | 6/1967 | Kurtz et al. | 242/156 |

Primary Examiner—Leonard D. Christian
Attorney, Agent, or Firm—Jack W. Hayden

[57] ABSTRACT

A support arrangement for feeding a continuous strand of welding rod includes shaft means with laterally extending means mounted in spaced relation to one end thereof with spindle means being mounted on the laterally extending means. The other end of the shaft means is received in a tubular housing which includes a lateral extension thereon with spindle means extending in opposed relation to the spindle means on the lateral extending means for receiving and supporting a spool thereon. Bearing means support the tubular housing and the shaft means to accommodate rotation of the shaft means and the spool supported thereon and cooperating friction brake means are mounted adjacent one end of the shaft means for restraining rotation of the shaft means in a desired manner.

3 Claims, 5 Drawing Figures

SUPPORT WITH DRAG ARRANGEMENT

SUMMARY OF THE INVENTION

Various arrangements have been proposed and heretofore used in connection with supporting continuous strands of material such as by way of example only welding rod which is fed from a spool, drum or the like to a welding gun for use in connection with continuous welding operations. When the welding operation is interupted or stopped, the feeding of the welding rod stops and it is desirable to substantially immediately stop the turning of the spool or drum to prevent the welding rod from contacting any machine component or structure that would serve as a ground and cause a short circuit when the welding rod is again electrically energized to start welding.

The present invention provides a relatively simple arrangement for accomplishing such function in that it provides an arrangement for supporting a spool of welding rod material to enable it to be rotated for unreeling the welding rod during welding operations so that the welding rod may be fed to a welding gun in a manner well known in the art. Braking means associated with the arrangement stops rotation of the shaft means and the drum means supported thereon when the welding rod is no longer being fed through the welding gun.

Still another object of the present invention is to provide a support arrangement for supporting a spool of welding rod material for rotation and unreeling of the welding rod as may be desired for supplying it to a welding operation and which incorporates suitable braking means for limiting rotation of the spool when welding operations are interrupted.

Other objects and advantages of the present invention will become more readily apparent from a consideration of the following description and drawings.

DESCRIPTION OF THE PREFERRED EMBODIMENT

Figure 2:
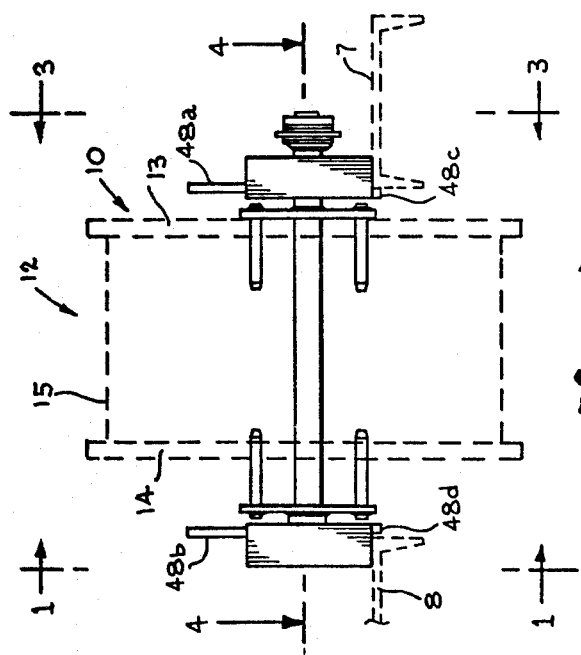
FIG. 2 is a side view of the preferred embodiment of the invention.
Figure 1:
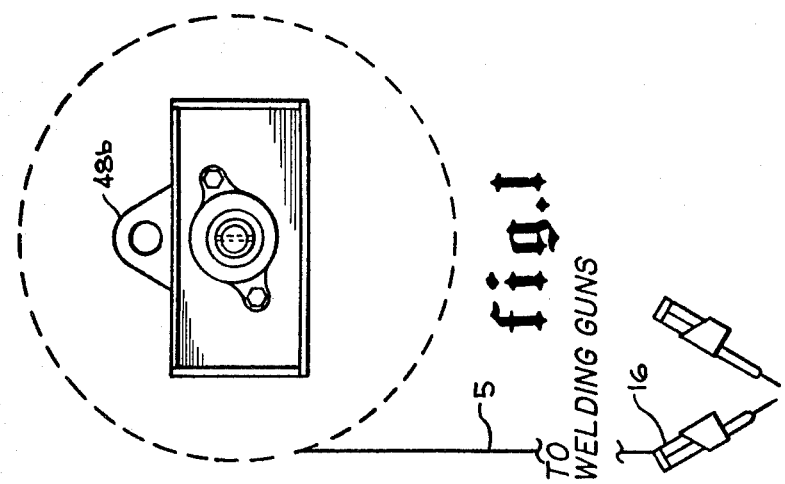
FIG. 1 is a left end view of the arrangement shown in FIG. 2 showing the rim of a spool in elevation.

Attention is first directed to FIG. 2 of the drawings wherein the present invention is referred to generally by the numeral 10. A spool referred to generally at 12 is illustrated in dotted line as being supported by the present invention to accommodate rotation thereof as material such as welding rod 5 is unreeled from the spool and fed to welding guns as illustrated generally at 16 in FIG. 1.

Figure 4:
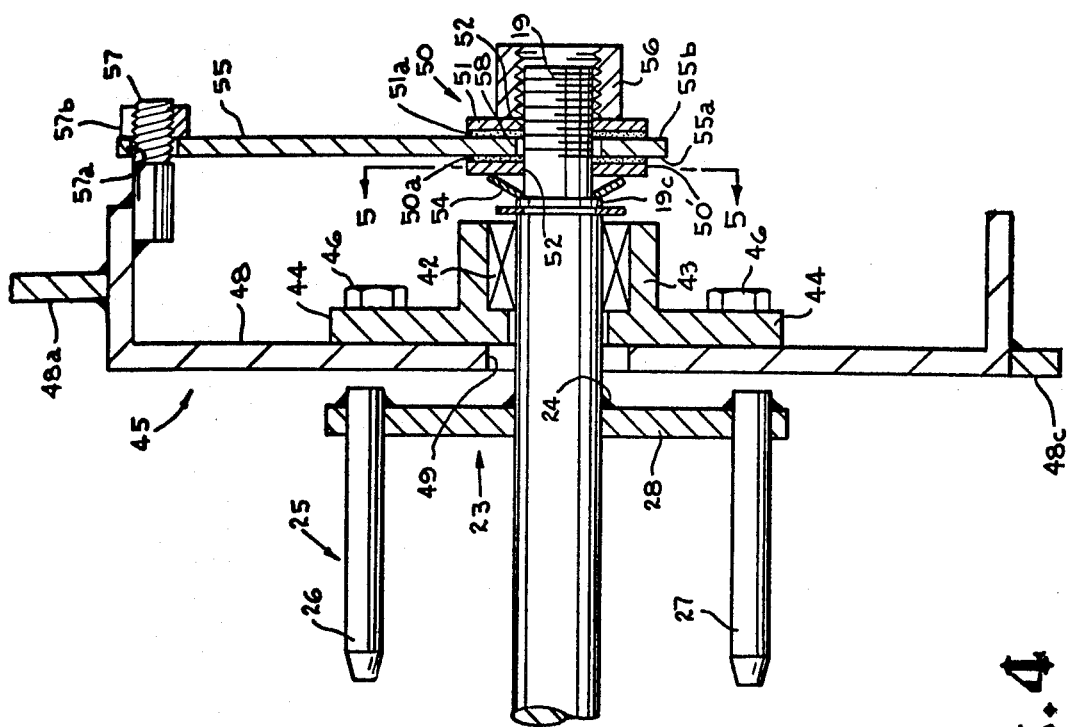
FIG. 4 is an enlarged sectional view on the line 4—4 of FIG. 2 illustrating in greater detail the components of the form of the invention shown in FIG. 2.

In FIG. 4 the preferred arrangement of the invention 10 is illustrated in greater detail and is shown as including longitudinally extending shaft means referred to generally at 18 having one end threaded as shown at 19 with the other end 20 being received within tubular housing means referred to generally at 22.

Laterally extending means referred to generally at 23 are secured to the shaft means by any suitable means such as a weld 24 or the like and is spaced longitudinally from the one end 19 a desired distance. Spindle means referred to generally at 25 are mounted on the laterally extending means 23, such spindle means 25 including the rod like members 26 and 27 secured to the plate 28 which forms the laterally extending means 23, which plate 28 extends preferably radially from the shaft means 18 as illustrated in the drawings. It will be noted that the axis of the members 26 and 27 extends in a plane parallel to the longitudinal axis of the shaft means 18 and in spaced relation thereto and the members 26, 27 are positioned to fit in holes provided in the spool rim as will be described.

The tubular housing 22 means includes a hollow cylindrical member 30 for telescopically receiving the other end 20 of the shaft means 18 therein as shown in FIG. 4 of the drawings. A lateral extension referred to generally at 31 extends radially from the tubular housing 30 and spindle means 33 are supported thereon.

The lateral extension 31 is in the form of a plate 32 and projects from the cylindrical member 30 adjacent one end thereof as shown in FIG. 4 of the drawings. The spindle means 33 is similar in configuration and arrangement to the spindle means 25 on the laterally extending means 23 and includes, as shown in FIG. 4 of the drawings rod like members 35 and 36.

It will be noted that the spindle means 25 and spindle means 33 extend toward each other in opposed relation and with the rods 26, 35 and 27, 36 terminating in spaced relationship as shown for engaging with the rims 13 and 14 of the spool 12 to support such spool as diagrammatically illustrated in FIG. 2. The cylindrical portion 15 of the spool receives the welding rod strand 5 thereon.

Suitable means are provided for maintaining a predetermined distance between laterally extending means 23 and laterally extending means 31 when the present invention 10 is initially fitted with a welding rod spool 12. As illustrated in the drawings such means is shown as being in the form of a pin 34 which extends through a suitable opening 35 in the cylindrical member 30 and provides a shoulder to form a stop adjacent which the end 20 of the shaft means 18 abuts.

Suitable bearing arrangements as referred to generally at 40 and 45 are mounted in spaced relation for rotatably supporting the shaft means 18. The bearing arrangements 40, 45 each include suitable bearing means referred to at 42. One of such bearing means is supported in the cylindrical extension 43 of plate 44. The plate 44 in turn is secured by any suitable means such as the bolts 46 to any suitable support means illustrated at 48.

It will be noted that the support means 48 each include an opening 49 for receiving the shaft therethrough and to enable the shaft 18, lateral extensions 23 and 31, as well as the spindle means 25 and 33 to freely rotate between such support means.

Figure 5:
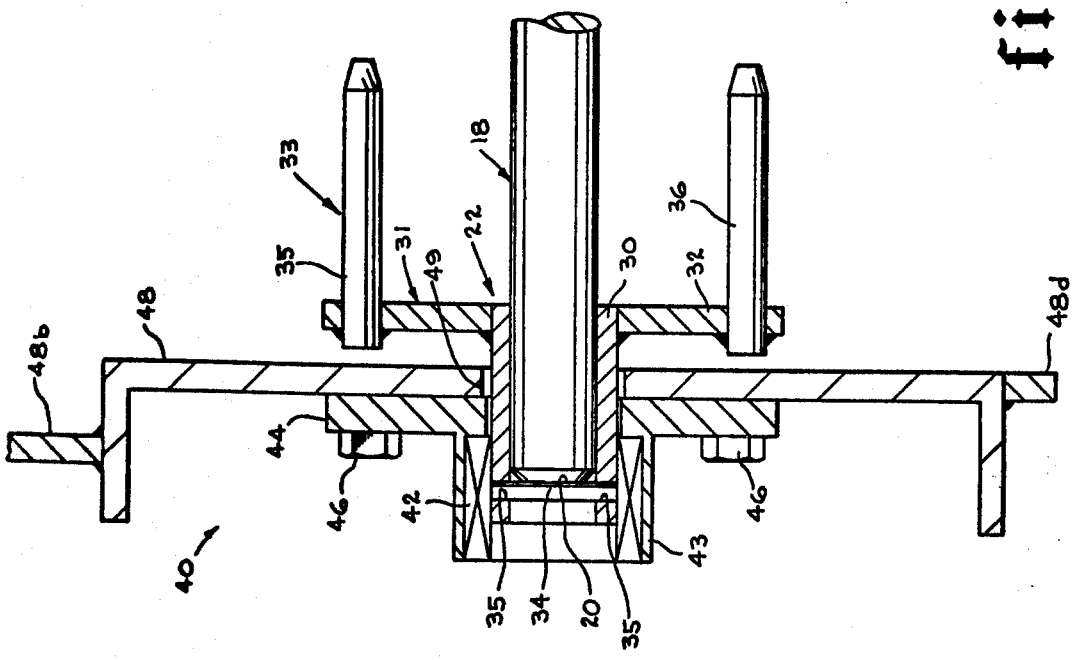
FIG. 5 is a sectional view on the line 5—5 of FIG. 4 to further illustrate structural arrangements thereof.

The one end 19 of shaft means 18 is provided with diametrically opposed, longitudinally extending flats 19a and 19b as better shown in FIG. 5 of the drawings which extend from the one end 19 of the shaft means 18 to the annular shoulder 19c formed thereon for a purpose as will be described.

It should be noted that cooperating friction brake means referred to generally by the numeral 50 is mounted adjacent the one end 19 of the shaft means 18 and on the bearing arrangement 45 nearest the end 19 for restraining rotation of the shaft means 18 to inhibit continued unwinding of welding rod off the spool 12 in an undesired manner.

The brake means 50 include first disc means 50' and second disc means 51 having openings 52 therethrough conforming in configuration with the portion of the shaft means 18 from the annular shoulder 19c to the end 19 of the shaft means 18 so that such disc means are slidably but nonrotatably mounted on the shaft means 18 adjacent the end 19 thereof.

Figure 3:
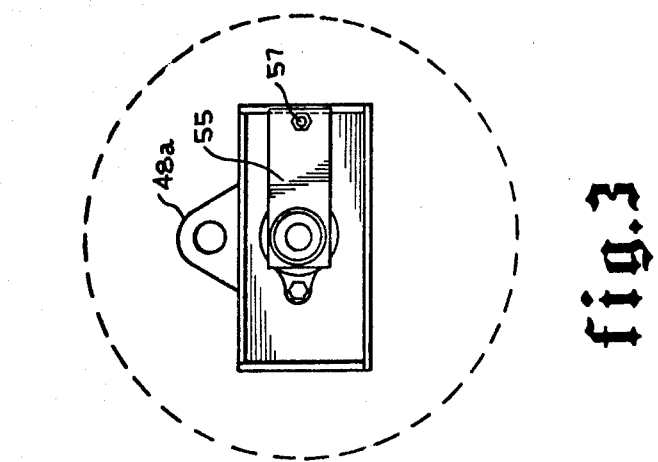
FIG. 3 is a right end view similar to FIG. 1.

Spring means 54 in the form of a Bellville spring abuts the annular shoulder 19c and the first disc means 50' as illustrated in FIG. 4 of the drawings to tend to resiliently urge such disc means towards the plate 55 as shown in FIG. 4. The second disc means 51 is mounted on the other side of the plate 55 and is abutted by the nut 56 which threadedly engages the threaded end 19 of the shaft means 18. The plate 55 is secured to the bearing arrangement 45 by any suitable means such as a bolt 57 or the like which is welded to arrangement 45 as shown in FIG. 3. An opening 57a in plate 55 slidably receives bolt 57 therethrough and nut 57b engages on bolt 57 and abuts plate 55 as shown. The plate 55 has an opening 58 therein which is larger in diameter than the end of the shaft 18 to accommodate rotation of the shaft therein.

The first and second disc means 50' and 51 carry friction means 50a and 51a respectively on the surfaces thereof facing the opposite sides 55a and 55b of the portion of the plate 55 extending between the first and second disc means 50' and 51.

In use of the present invention, the spindle means 25 may be engaged in openings normally provided in the rim 13 of the spool 12 and the shaft means 18 extended through an axial opening in the drum. The bearing means 45 is positioned on shaft 18 as is bearing means 40, and the shaft means extends into and is engaged with the tubular housing means 22 as previously described. It can be appreciated that at the time that the tubular housing 30 is positioned on the shaft means 18 the spindle means 33 thereon will simultaneously be engaged in suitable openings normally provided in the opposite rim 14 of the spool 12 so that the spool 12 is thus mounted for rotation with the shaft means 18 as schematically illustrated in FIG. 2 of the drawings.

Eyes 48a and 48b are provided on each support means 48 so that the reel 12 with the present invention 10 may be lifted by any suitable means such as a crane or the like and positioned on channel supports 7 and 8. Projections 48c and 48d engage the edge of 7 and 8 respectively to maintain the present invention engaged with reel 12 during use.

The present invention accommodates rotational movement of the shaft means 18 and spool supported thereon but the brake arrangement 50 tends to restrain such rotation to inhibit continued rotation of the spool 12 when welding operations are interrupted. During welding operations the strand of welding rod 5 is fed to a welding gun represented at 16 and as welding operations proceed, the strand is unreeled from the rotating spool 12. In the absence of some arrangement to stop rotation of spool 12 substantially simultaneously with interruption or discontinuance of welding operations, the welding rod 5 would continue to unreel from the spool. The present invention inhibits this from occurring.

It can be appreciated that to accomplish this the friction surfaces 50a and 51a formed on the first and second disc means 50' and 51 are in engagement with the surfaces 55a and 55b of the plate 55 thus acting the brake or restrain rotation of the shaft means 18. In other words, the first and second disc means 50' and 51 as well as the shaft means 18 are rotatable relative to the stationary plate 55 as welding rod 5 is fed or removed from the spool 12, but if welding operations are discontinued or interrupted, the frictional engagement between the friction surfaces 50a, and 51a, and plate surfaces 55a, 55b respectively tend to stop rotation of the spool 12 to prevent further undesirable movement of the welding rod off the spool.

The nut 56 in effect functions as an adjusting means for the brake means 50 so that tightening of the nut 56 on shaft 18 causes a greater frictional drag between the frictional surfaces and loosening of the nut of course causes less friction and freer rotation of the shaft 18. The support arrangement of plate 55 enables it to shift along bolt 57, or to be shifted by adjustment of nut 57b so as to properly position it between disc means 50' and 51.

The foregoing disclosure and description of the invention are illustrative and explanatory thereof, and various changes in the size, shape, and materials as well as in the details of the illustrated construction may be made without departing from the spirit of the invention.

What is claimed is:

1. A spool support bearing arrangement for feeding a continuous strand of welding rod including:
   a. shaft means;
   b. laterally extending means mounted on said shaft means and spaced from one end thereof;
   c. spindle means mounted on said laterally extending means and extending in a plane spaced from and parallel to the longitudinal axis of said shaft means;
   d. tubular housing means for receiving the other end of said shaft means;
   e. a lateral extension on said tubular housing means;
   f. spindle means mounted on said lateral extension and extending in a plane spaced from and parallel to the longitudinal axis of said tubular housing means;
   g. said spindle means on said lateral extension and on said laterally extending means extending toward each other in the same plane and terminating in spaced relation;
   h. means for positioning said tubular housing means with said shaft means;
   i. longitudinally spaced bearing means for supporting said tubular housing means and shaft means to accommodate rotation thereof;
   j. cooperating friction brake means mounted adjacent one end of said shaft means and on said bearing arrangement adjacent thereto for restraining rotation of said shaft means.

2. The invention of claim 1 including adjustable means mounted on said shaft means for adjusting said cooperating friction brake means to selectively increase or decrease the braking effect on said shaft means.

3. The invention of claim 1 wherein said cooperating friction brake means includes:
   1. first and second disc means slidably and non-rotatably supported adjacent said one end of said shaft means;
   2. spring means supported on said shaft means and abutting said first disc means;
   3. plate means secured to said bearing arrangement and extending between said first and second disc means, said plate means having an opening through which said one end of said shaft means projects; and
   4. friction surface means on said first and second disc means for frictionally contacting said plate means; and
   5. means threadedly engaged with said one end of said shaft means for adjusting the frictional contact between said first and second disc means and said plate means.

* * * * *